US010158968B2

(12) United States Patent
Stroud

(10) Patent No.: US 10,158,968 B2
(45) Date of Patent: Dec. 18, 2018

(54) COMMUNICATION METHOD AND SYSTEM

(71) Applicant: Paxton Access Limited, Brighton, East Sussex (GB)

(72) Inventor: Adam Stroud, Brighton (GB)

(*) Notice: Subject to any disclaimer, the term of this patent is extended or adjusted under 35 U.S.C. 154(b) by 0 days.

(21) Appl. No.: 15/412,030

(22) Filed: Jan. 22, 2017

(65) Prior Publication Data

US 2017/0134889 A1    May 11, 2017

Related U.S. Application Data

(63) Continuation of application No. 14/446,639, filed on Jul. 30, 2014, now Pat. No. 9,591,693.

(30) Foreign Application Priority Data

Jul. 30, 2013  (GB) .................................. 1313586.8
Mar. 21, 2014  (GB) .................................. 1405133.8

(51) Int. Cl.
*H04B 5/00*       (2006.01)
*H04W 4/00*       (2018.01)
*H04W 88/06*      (2009.01)
*G05B 15/02*      (2006.01)
(Continued)

(52) U.S. Cl.
CPC ............ *H04W 4/008* (2013.01); *G05B 15/02* (2013.01); *H04B 5/0031* (2013.01); *H04B 5/0037* (2013.01); *H04W 4/80* (2018.02); *H04W 48/16* (2013.01); *H04W 88/06* (2013.01); *H04B 5/0075* (2013.01); *Y02D 70/00* (2018.01);
(Continued)

(58) Field of Classification Search
CPC ........ H04W 12/08; H04W 84/12; H04B 5/00; H04B 5/02; H04B 5/0025; H04B 5/0056; H04B 5/0062; H04B 5/0068; H04B 5/0075; H04B 7/26; H04M 1/6091; H04M 1/7253; H04M 2250/04
USPC ...... 455/41.1, 41.2, 41.3, 410, 552.1, 553.1; 340/5.1, 5.2, 5.21
See application file for complete search history.

(56) References Cited

U.S. PATENT DOCUMENTS 8,466,773 B2* 6/2013 Willgert ................. G06F 21/35
                                                    340/5.2
8,508,332 B2* 8/2013 Jones ................ G07C 9/00309
                                                    340/5.2
(Continued)

*Primary Examiner* — Quochien B Vuong
(74) *Attorney, Agent, or Firm* — Fernando & Partners, LLP; Ronald S. Fernando

(57) ABSTRACT

A system for implementing a control or access function is described. The system comprises a mobile device having a mobile identifier, a short range communication interface and a long range communication interface. The system also comprises a local device having a local identifier. The system also comprises a remote device comprising a long range communication interface and a controller. The mobile device is configured for short range communication with the local device for receiving the local identifier, and the remote device is configured for long range communication with the mobile device for receiving a communication comprising at least the local identifier and the mobile identifier. The controller of the remote device is configured to perform at least one control or access action in response to receiving the communication from the mobile device. A controller for implementing a control or access function is also described.

18 Claims, 6 Drawing Sheets

Figure 1:
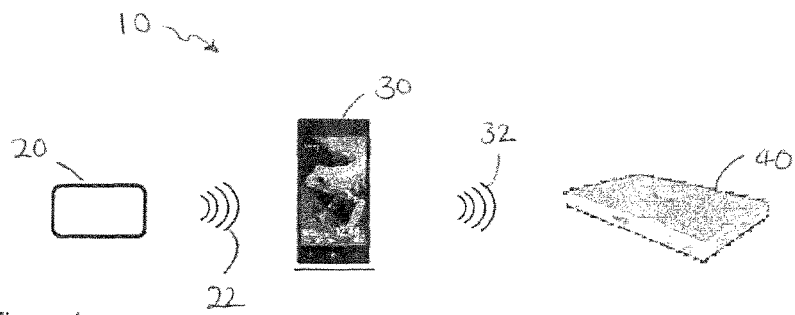

(51) Int. Cl.
*H04W 48/16* (2009.01)
*H04W 4/80* (2018.01)

(52) U.S. Cl.
CPC .......... *Y02D 70/142* (2018.01); *Y02D 70/144* (2018.01); *Y02D 70/164* (2018.01); *Y02D 70/166* (2018.01)

(56) References Cited

U.S. PATENT DOCUMENTS

| | | | |
|---|---|---|---|
| 8,594,573 B2* | 11/2013 | Miettinen | A61B 5/0006 455/41.2 |
| 9,609,515 B2* | 3/2017 | Tredoux | H04W 12/08 |
| 2013/0333055 A1* | 12/2013 | Pallakoff | H04L 63/10 726/29 |
| 2014/0232522 A1* | 8/2014 | Schmidt-Lackner | G07C 9/00126 340/5.28 |
| 2015/0189505 A1* | 7/2015 | Marien | H04L 63/0838 380/270 |

* cited by examiner

COMMUNICATION METHOD AND SYSTEM

RELATED APPLICATIONS

This application is a continuation of U.S. application Ser. No. 14/446,639, filed on Jul. 30, 2014, and also claims the benefit of United Kingdom (UK) Patent Application No. GB1313586.8, filed on Jul. 30, 2013, and UK Patent Application No. GB1405133.8, filed on Mar. 21, 2014, both of which are incorporated by reference herein.

TECHNICAL FIELD

The present invention relates to methods and systems for implementing or managing control or access functions, particularly via short range wireless communication with a local device or system associated with a control or access function.

DETAILED DESCRIPTION

The use of wireless communication systems is widespread and such systems have many applications, including but not limited to tracking, identification or tagging, access control, payment, etc. Secure access systems are widely used to ensure only authorised personnel are permitted entry to a building or area, allowing an employee to enter their office but not an unauthorised person, for example. Authentication is typically achieved by use of a short range wireless communications module such as an RFID (Radio Frequency Identification) tag being presented at close range to a reader located near an entry point to a secure area. The reader, or associated local control unit, may contain the necessary information to authenticate the tag or, in many cases, will be connected to a central authentication unit, and if the person is authorised to enter the secure area, the associated door will be unlocked or opened.

Secure access systems commonly have more than one entry point, thus requiring a number of readers. If the authentication information is stored in the reader, or associated local control unit, as a result a system having multiple readers can be expensive and requires each reader to be updated separately with any new or changed information. Alternatively, if the readers communicate with a central authentication unit, significant costs and effort are required to install the wires or cables required to connect each reader to the central unit. In any event, the installation of the readers requires each reader to be provided with a power connection irrespective of whether a data communication connection is required so the installation of such systems is expensive and not straightforward.

The present invention seeks to provide systems and methods for implementing or managing control or access functions that are convenient for the user and that are simple to install, modify and update. The present invention also seeks to provide versatile and adaptable systems that are capable of many different functions.

According to a first aspect of the present invention, there is provided a communication device having a low-power mode and a higher-power mode for implementing a control or access function, comprising: a short range wireless communication interface; a long range wireless communication interface; a local identifier stored therein; wherein in the low-power mode the communication device is operable to receive a mobile identifier from a mobile device over the short range wireless communication interface and upon receiving the mobile identifier the higher-power mode is enabled; in the higher-power mode the communication device is operable to communicate over the long range wireless communication interface with a remote device having a controller; wherein the communication device is configured to send the local identifier and the received mobile identifier to the remote device; and wherein the controller of the remote device is configured to perform at least one control or access action in response to receiving the local identifier and the mobile identifier.

The present invention provides a communication device that can be used as an access or control device. For example the communication device can be used as an access control reader that can be provided beside an access-controlled door or other device to be controlled. To conserve power, the communication device is provided with two power modes: a low power mode, for example the BLE "Whisper Mode", enabling short range communications; and a higher- or normal-power mode enabling longer-range communications. The communication device can communicate both with a mobile device (via a short range wireless communication, for example via Bluetooth Low Energy (BLE) operating in a low power "Whisper Mode" or Near Field Communications (NFC) which can operate passively) and with a remote device via a long range wireless communication (for example via Bluetooth Low Energy (BLE) connection operating in a higher-power or normal-power mode or Wi-Fi). While waiting for a mobile device to move into range and transmit a mobile identifier to the communication device, the communication device can conserve power by not operating in a higher- or normal-power mode constantly or for long periods of time. When a mobile identifier is received, the communication device engages the higher- or normal-power mode to enable the long range wireless communications required to communicate with the remote device. This provides a communication device that can use available power sources or a battery due to low-power consumption requirements and no requirement for a wired connection to a data infrastructure as it communicates wirelessly, making it suitable for locations to which it would be uneconomic or difficult to provide data cabling and/or power cabling. This is advantageous because each communication device can be placed in the location that is most suited to its purpose and there is a reduced constraint imposed on locating devices due to wiring requirements.

According to a second aspect of the invention, there is provided a method of implementing a control or access function in a communication device having a low-power mode and a higher-power mode comprising the steps of: receiving at the communication device while the communication device is operating in a low-power mode a short range wireless communication from a mobile device, the short range wireless communication comprising at least a mobile identifier associated with the mobile device; enabling a higher-power mode of the communication device on receipt of the mobile identifier; transmitting from the communication device a long range wireless communication to a remote device while the communication device is operating in a normal-power mode, the long range wireless communication comprising at least the mobile identifier and a local identifier associated with the communication device; wherein the remote device is operable to receive and process the long range wireless communication in order to perform at least one control or access action based on the information obtained from processing of the long range wireless communication.

Preferably, the short range wireless communication interface and the long range wireless communication interface of the communication device are comprised of one and the same communication interface, preferably operating in different modes. The use of a single communication interface by the communication device reduces device hardware complexity and power usage as only one transceiver and antenna can be used to perform both short and long range communications using different modes.

Preferably, the communication device returns to the low-power mode after the local identifier and the mobile identifier are sent by the communication device to the remote device via the long range communication interface. By returning to a low-power mode after transmitting the identifiers, the communication device can reduce or minimise power consumption.

Preferably, the communication device is operable to communicate substantially within a range of approximately 30 cm in the low-power mode. When operating in a low-power mode, thus reducing or minimising power consumption, the range of communication using a wireless communication interface is restricted. As a result of the range of the communication being restricted, the communication device will operate to detect only mobile devices within a short range of approximately 30 cm. This limited range is useful for verifying that the mobile device as it is only possible to communicate with a mobile device that is definitely near the communication device, i.e. within 30 cm of the communication device. This also reduces the likelihood that, when a mobile device is detected, a user intends to present to the mobile device to the communication device to trigger an access or control function.

Preferably, the communication device is operable to communicate substantially within a range of 30 m in the higher-power mode. When operating in higher-power or normal-power mode, the communication device needs to be able to communicate with a remote device usually not located in the vicinity of the communication device but usually located within a range of 30 m of the communication device. Alternatively, there may be provided one or more intermediate nodes using the long-range communication protocol enabling the communication device and remote device to communicate via the intermediate nodes.

Preferably, the communication device further comprises a second short range wireless communication interface for communicating with identification tokens, the identification tokens able to passively or actively transmit a mobile identifier to the communication device. Some systems are likely to operate a hybrid arrangement where existing identification tokens are still used by one or more users and thus the communication device can support both legacy active or passive identification tokens using the second short range communication interface and also user mobile devices using the (first) short range communications interface.

Preferably, the second short range wireless communication interface is NFC. NFC provides a protocol that allows the use of passive tokens by users and is supported by most manufacturers of such tokens.

Preferably, the communication device further comprises a battery and the communication device is powered by the battery. Further preferably, the battery is a coin battery. The communication device is designed to reduce or minimise power consumption and due to this reduced or minimised power the use of a battery, preferably a coin battery, is possible to provide power to the device for a useful amount of time without requiring the battery to be regularly replaced or charged.

Preferably, the communication device further comprises a proximity sensor configured to activate the low-power mode of the communication device and wherein the proximity sensor is operable to detect any or all of: the movement of a hand in the vicinity of the communication device; the mobile device in the vicinity of the communication device; or a change in capacitance in the vicinity of the communication device. Through the use of a proximity sensor, the communication device can operate with no power being provided to the communications interfaces until the proximity sensor detects that a user is nearby the communication device.

Alternatively, the communication device can further comprise a proximity sensor configured to trigger the communication device to request a mobile identifier from the mobile device via the short range wireless communications interface and wherein the proximity sensor is operable to detect any or all of: the movement of a hand in the vicinity of the communication device; the mobile device in the vicinity of the communication device; or a change in capacitance in the vicinity of the communication device. Through the use of a proximity sensor, the communication device can only accept receipt of mobile identifiers in response to a request sent in response to the proximity sensor verifying that the user or mobile device is near the communication device and that the user is performing an action such as waving a hand or a mobile device near the communication device that indicates that the user is requesting an access or control function to be performed by the communication device. In this alternative, the proximity sensor can also power up one or both communication interfaces as well.

Preferably, the communication device begins communications with the mobile device over the short range wireless communication interface by requesting the mobile identifier from the mobile device. By requesting the mobile identifier from the mobile device, the mobile device can confirm that it is near the communication device thus removing the need to broadcast or otherwise determine when to communicate the mobile identifier.

Preferably, the mobile identifier comprises any of a MAC address; a Bluetooth MAC address; a Bluetooth Identifier, a QR code or a dedicated identifier. The use of an existing identifier such as a MAC address or a Bluetooth MAC address for example enables the re-use of an integral and unique feature of a mobile device while the use of a dedicated identifier or QR code allows a user to store such an identifier on their mobile device to add the functionality required for the access or control system.

Preferably, the communication device also receives a unique identifier in addition to the mobile identifier from the mobile device and sends the received unique identifier to the remote device using the long range wireless communication interface along with the mobile identifier, wherein the unique identifier comprises any of a MAC address; a Bluetooth MAC address; a Bluetooth Identifier, a QR code or a dedicated identifier. It may be necessary to send both a mobile identifier and a unique identifier from a mobile device to the communication device, for instance the user can have an identifier associated with that user while the mobile device can have an identifier associated with that mobile device enabling both the user to be verified and the mobile device to be verified. Alternatively, the user may have two identifiers associated with them, for instance a personal identifier and a team identifier or the mobile device may have two identifiers associated with it to verify an identifier associated with the mobile device hardware as well as a software provided identifier. The use of a unique identifier allows more flexibility in verification of the combination of user, mobile device and communication device for access or control purposes.

Preferably, the controller of the remote device is further configured to request the mobile device to make a connection using a third long range protocol to verify that the mobile device is within the proximity of the communication device, preferably requesting location data from the mobile device to be transmitted to the remote device wherein the location data can be a GPS location. As a further verification that the user's mobile device is in the proximity of the communication device, a direct connection can be established with the mobile device by the remote device to verify that the mobile device is near the communication device, preferably using GPS location data to verify the mobile device location. Preferably the location of the communication device is predetermined and stored by the remote device in order to enable the remote device to assess whether the location data provided by the mobile device is within a predetermined range of the communication device, preferably further taking into account a tolerance for incorrect location data reporting. As an alternative, the mobile device and remote device can communicate indirectly via the communication device.

Preferably, the third long range protocol is Wi-Fi. As Wi-Fi networks are extremely common in most situations where an access or control system is installed, for example an office or factory, the use of an existing Wi-Fi network to which a mobile device may be connected enables an alternative path to connect the remote device directly to the mobile device to perform verification or data exchange as required for the access or control system.

Preferably, the communication device has a medium-power mode that is used to communicate with the mobile device over the short range wireless communication interface when the communication device receives the mobile identifier from the mobile device. Where a medium-power mode is used, the range of the communication interface is usually increased in comparison to the range possible in a low-power mode, thus use of a medium-power mode can enable either faster or more efficient or longer range communication between a mobile device and a communication device.

Preferably, the controller of the remote device is operable to send a security query to the mobile device, the security query comprising a request to receive, via either a long range wireless communications protocol direct with the remote device or via the communication device, any of a random number, a personal identification number, a bar-code or QR-code, GPS co-ordinates of the mobile device or a facial recognition confirmation. Where further verification of a user is required, to ensure that an unauthorised user is not simply using an authorised device to gain access or control in place of an authorised user, the remote device can communicate either directly or indirectly with the mobile device to perform a further verification step such as requiring the user to correctly answer a security query.

Preferably, the system comprises: a communication device; one or more mobile devices; the remote device comprising a long range wireless communication interface and a controller; wherein the controller of the remote device is configured to perform at least one control or access action in response to receiving the communication from the communication device. The system can support more than one mobile device, each associated either with a specific user or group of users or a pool of mobile devices to be used by a group of users or single user.

Preferably, the mobile device comprises a mobile communications device, preferably a smartphone, tablet or the like. The use of existing user hardware such as smartphones or tablets means that dedicated identity tokens are not required for each user and a more flexible solution is possible.

Preferably, the short range wireless communication interface of the communication device comprises a Bluetooth Low Energy (BLE) whisper mode interface and the mobile device is preferably a BLE-enabled smartphone. The use of the BLE protocol allows the communication device to operate efficiently in terms of power use and provides a well-supported communication means that many mobile devices support, enabling the access or control system to be supported using existing mobile devices.

Preferably, the long range wireless communication interface of the communication device comprises a Bluetooth Low Energy (BLE) interface and the remote device is preferably BLE-enabled. The use of the BLE protocol allows the communication device to operate efficiently in terms of power use and provides a communication means that has sufficient range to enable communication between a remote device and communication device.

An alternative aspect of the present invention provides a system for implementing a control or access function, the system comprising a mobile device having a mobile identifier stored therein and comprising a short range communication interface and a long range communication interface, a local device having a local identifier stored therein, and a remote device comprising a long range communication interface and a controller, wherein the mobile device is configured for short range communication with the local device for receiving the local identifier, the remote device is configured for long range communication with the mobile device for receiving a communication comprising at least the local identifier and the mobile identifier, and the controller of the remote device is configured to perform at least one control or access action in response to receiving the communication from the mobile device.

This alternative aspect of the present invention provides a system in which a mobile device communicates both with a local device via short range wireless communication and with a remote device via a long range communication. Therefore the remote device does not need to communicate with the local device directly, which is advantageous because it then follows that the local device does not require the significant amount of power that would otherwise be needed for long range communication directly with the remote device. The mobile device has its own mobile identifier and is provided with a local identifier that identifies the local device, both of which the mobile device can transmit to a remote device and the remote device is therefore provided with enough information so that an appropriate control or access action can be performed, the action being relevant to the local device that has been identified via the mobile device. Advantageously, wires or cables are not required to connect each local device to the remote device or the mobile device. Therefore this aspect provides a system that is simple to install and cost effective yet is reliable and enables local control and access to be implemented from a remote location.

In all aspects, the local device, mobile device or communication device may be provided with additional wireless communication capabilities in order to support any suitable legacy device that is capable of storing an identifier and that is responsive to short range communication. For example, the local device may be an active device, such as an active token, that comprises an internal power source for powering short range transmission of at least the local identifier to another device. The power source may, for example, be an external power supply or a low power internal battery. Alternatively, for example, the local device may be passive and therefore requires no internal power source. For example the local device may comprise a passive token. Examples of suitable passive tokens are MIFARE tokens, such as the MIFARE UltraLight range of tokens. Passive tokens can be small and lightweight and inexpensive to manufacture, enabling a number of tokens to be installed in an area without significant expense. Furthermore with no power source required, the tokens can easily be installed simply by affixing the token (with adhesive or mechanical fixing means for example) to a suitable location or object with no wiring required and the token does not need to be removable to enable an internal battery to be replaced. This is advantageous because each token can be placed securely in the location that is most suited to its purpose and there is no constraint due to wiring requirements or the need to have the token be removable that might otherwise cause the token to be located in a less than ideal location. Passive tokens are powered by interaction with another device, for example with the mobile device inductively coupling or otherwise providing power to the passive token to enable the token to release information.

In the alternative aspect, the local device has an identifier stored therein. The identifier comprises information of any type that identifies either the specific device (i.e. the local identifier is unique to that token) or may identify a group or set of devices. For example the local identifier is a passive token and may identify the token as being one of a set of tokens that are associated with one or more common systems, or groups of users, as discussed further below. The mobile device may be configured to provide power to the local device when the mobile device is brought into contact or into close proximity with the local device, to enable the local device to release the local identifier to the mobile device. In other aspects, the communication device has an identifier stored therein and in this and other aspects the mobile device can, alternatively or additionally, have an identifier stored therein.

The mobile device comprises any suitable device which can be transported to different locations so that it can communicate via short range wireless transmissions with other devices with which the mobile device comes into range. The mobile device can be a dedicated device such as an RFID card equipped additionally with a long range communication interface. The mobile device can, for example, be an active token provided with a short range interface and a long range interface and a power supply, such as a coin cell battery or the like. Alternatively the mobile device may be an existing device, e.g. a computer, such as a laptop or other portable device, or may be a personal digital organiser (PDA), or a tablet device or a mobile phone, such as a smartphone. Therefore the user of the mobile device does not require a separate or dedicated device to be able to control or access functions of a system and instead can use their existing mobile device.

In the aspects above, the mobile device can comprise a short range communication interface which may comprise any suitable short range interface such as, for example, a Bluetooth Low Energy (BLE) interface when operating in a low-power "Whisper Mode", a near field communications (NFC) interface or any other short range, radio frequency (RF) interface such as an RFID interface. The mobile device may be a BLE-enabled or an NFC-enabled smartphone. The conventional way of adopting NFC is by way of the phone emulating a token or credential. For such conventional systems to be secure, the mobile phone, its SIM card, or both, must have a secure element against which secure data can be verified. In addition, a trusted service provider (TSP) must perform online verification of the NFC. Compatibility issues with phone manufacturers and SIM card providers makes such systems difficult and complex to implement whereas the present system is advantageous because it enables compatibility with any NFC-enabled phone without the above complications present with emulating a token or credential.

The mobile device comprises a long range communication interface which may comprise any suitable long range interface such as, for example, a Bluetooth (e.g. Bluetooth or Bluetooth LE) interface, or a Wi-Fi interface, etc. The mobile device may be a Bluetooth-enabled smartphone.

References throughout the specification to "short range" and "long range" communications, interfaces, etc., are intended to distinguish between localised communication and communication with another device that is remote from the local device. In particular, short range communication is intended to describe systems which require either contact between the two communicating devices or at least for the interfaces of the two communicating devices to be in close proximity with each other, i.e. to be separated from each other by no more than about 0.3 m, preferably by no more than about 0.2 m or preferably by no more than about 0.1 m. As discussed above, NFC, Bluetooth Low Energy (BLE) when operating in a low-power "Whisper Mode" and RFID communications are considered to be short range communications according to embodiments of the present invention. Long range communication is intended to describe systems which typically do not require contact between the two communicating devices nor for the interfaces of the two communicating devices to be in close proximity with each other. Long range communications in accordance with embodiments of the present invention are communications that typically occur over a distance of one or more metres, such as over about 1 m or preferably over a range of about 0.5 to 500 m, preferably over a range of about 1 to 200 m, preferably over a range of about 10 to 100 m. As discussed above, Bluetooth, Bluetooth Low Energy (BLE) when operating in a normal-power mode (i.e not operating in a low-power "Whisper Mode") and Wi-Fi communications are considered to be long range communications according to embodiments of the present invention, as are communications over the mobile/cellular/3G/4G/mobile broadband, etc., networks.

The remote device can be any suitable device which can receive long range wireless communications from a mobile device or communication device and that can control one or more control or access functions of a system. For example, the remote device may comprise a wireless router or access point that may also be connected either wirelessly and/or via wired connections to one or more devices, appliances, systems, etc. The devices, appliances, systems, etc., which the remote device controls may be related by one or more common features. For example, the devices, appliances, systems, etc., may all be located in the same or in related areas of, for example, a building, e.g. inside an office or an office floor plate of a business premises. In such an example, the systems may comprise the building/office access systems (e.g. controlling the door locking mechanisms), the lighting systems, the communications systems, the heating and/or cooling systems, etc. The devices or appliances may comprise power sockets, lighting units, heating units, computers or other IT equipment, audio and/or video equipment, etc. Thus the remote device can advantageously control any one or more of the electronic devices, appliances and systems in an office (or indeed any other) environment in response to receiving a long range communication from a mobile device or communication device that is located in the environment.

The above examples are particularly advantageous when combined with passive tokens as discussed above or with the communication devices of the first aspect of the present invention. For example, in an office environment as described above, a token or communication device can be located (e.g. adhered or otherwise affixed) where a light switch would typically be located. A user entering the office can place their smartphone in close proximity to the token or communication device in order to control the lighting system via the remote device to switch on the lights. More than one token or communication device may be located about the office environment to enable the lighting system to be operated from a number of different locations. Advantageously, tokens or communication devices can additionally or alternatively be placed in locations where a light switch may not normally be located (typically due to wiring/cost constraints), such as on a wall next to where an office user sits when at their desk. Tokens or communication devices can also be used to enable the user to gain access to the office environment. For example, a token or communication device can be affixed near to any door that permits access to the environment. A user wishing to enter the office can place their smartphone in close proximity to the token or communication device in order to control the locking mechanism of the door, causing the door at least to be unlocked and also may be opened by the remote device. Any other appliances, systems, devices, etc., in the office can also likewise be controlled by appropriate placement of a token or communication device nearby or on the item and a controlling connection with the remote device. Further examples of such applications are discussed in detail below wherein the token or communication devices can be interchanged or combined.

The remote device receives a long range communication from a mobile device or communication device and performs an access or control function accordingly, as discussed above. In some instances, however, it may be desirable for the remote device to perform another control or access action. The controller of the remote device therefore may be configured to perform at least one further control or access action in the absence of the remote device receiving a further communication from the mobile device or communication device, for example in the absence of the remote device receiving a further communication from the mobile device or communication device within a time period. This is advantageous in that if, for example, the user leaves the area where the local device or communication device is located without deactivating the system which the remote device has switched on, then the remote device further controls the system to switch it off again, even without a specific command.

In the example of an office environment in which one or more tokens is located to enable activation of a lighting system via a mobile device, then if the user leaves the office, the remote device can switch off the lights even without the user bringing their mobile device within short range of a token. The token can be a local device or a communication device. Switching off the lights could be done automatically, for example, after an elapsed time period. Alternatively, after an elapsed period of time the remote device could send a long range communication to the mobile device or communication device and in the absence of a response from the device (thus indicating that the user is no longer in the environment), the remote device can then deactivate the system (e.g. switch off the lights).

Alternatively or additionally, the remote device can determine whether to perform a further control or access action in response to a different communication from the mobile device or one or more communication devices. For example, if the mobile device or a communication device sends a communication to the remote device to switch on the lighting system, but then the remote device receives a further communication from the mobile device or from the same or another communication to operate the door locking mechanism, the remote device can also operate the lighting system to switch off the lights as operation of the door locking mechanism suggests that the user is leaving the environment. Many different combinations of communications from the mobile device and/or communication device are possible and can inform the remote device of the user's activity and requirements even without the user needing to present their mobile device to a particular local device or communication device.

The controller of the remote device can be configured to perform at least one control or access action in response to receiving the communication from the mobile device or communication and can do so in any suitable manner. The controller of the remote device may transmit a control signal to control at least one device or system located in the vicinity of the local device or communication device, and/or may transmit, via the long range wireless communication interface of the remote device, at least one of information and a command to the mobile device. The controller may store information related to the mobile device and/or the local device or communication device in a memory of the remote device. When the remote device transmits a long range communication comprising information and/or a command to the mobile device, this may cause information to be displayed on the mobile device and/or may require a user to input information into the mobile device. For example for implementing an access function to enable a person to enter an office environment, the user places their mobile device in the vicinity of the token located near the door as discussed above. In response to the long range wireless communication from the mobile device or communication device, the remote device transmits back a long range wireless communication causing an image to be displayed on the mobile device. The user is required to interact with the display (e.g. to touch certain parts of the display to authenticate their request for access) and in response a further long range wireless communication is transmitted to the remote device, which can then control operation of the access function to enable the user to enter the environment if they are entitled to do so.

As stated above, the controller of the remote device can be configured to perform at least one control or access action in response to receiving the communication from the mobile device. However, although the controller of the remote device can be configured to perform at least one control or access action, it may be that no control or access action is necessary in some scenarios and thus no control or access action is actually performed. For example, if an unrecognised mobile device is brought within range of the local device or communication device and if the remote device receives a communication comprising the local identifier and/or a mobile identifier, it may be determined that the mobile device is unrecognised and that no control or access action should be performed. In another scenario, the local device may be unrecognised, for example if a mobile device is brought within range of a local device that is part of another system. If the remote device receives a communication comprising the local identifier and a mobile identifier, it may be determined that the local device is unrecognised and that no control or access action should be performed.

As discussed above, the controller of the remote device may be configured to transmit a control signal to a device or system in the vicinity of the local device or communication device to switch on and/or to switch off the device or system. The device or system in the vicinity of the local device or communication device may comprise at least one of a locking mechanism for a door, the door preventing access to at least one area when locked by the locking mechanism, a lighting system for lighting the area in which the local device or communication device is located, a heating and/or cooling system for heating and/or cooling the environment in the vicinity of the local device or communication device, at least one power source for enabling power to be provided to devices and systems located in the vicinity of the local device or communication device, a communications device or system for enabling two-way communication with at least one remote communications device or system, an audio and/or video device or system for providing audio and/or video output to the area in the vicinity of the local device or communication device, and any other powered device or system located in the vicinity of the local device or communication device. Thus a remote device is provided that is ideally suited to controlling an environment such as an office or the like.

In the alternative aspect, the local identifier that is released to the mobile device may be encrypted for enhanced security. However for some local devices, particularly for passive tokens, the identifier is simply released in response to a short range wireless communication and is not encrypted by the local device for transmission. For short range local devices such as passive tokens, this is not much of a security risk because any other device that wanted to intercept the identifier would need to be within the short range of the local device (typically within about 10 cm of the device, e.g.), which would likely be apparent to the genuine user. Nevertheless, the mobile device subsequently transmits the local identifier (and indeed its own mobile identifier) over a long range wireless communication to the remote device, which may be more susceptible to interception. Therefore the mobile device may further comprise a processor configured for processing the local identifier received from a local device such that the communication transmitted to the remote device comprises the processed local identifier. The processor may be configured for encrypting the local identifier. Therefore even if the local identifier received by the mobile device is unencrypted, the mobile device can encrypt the information before transmitting it for reception by the remote device, protecting the more risky transmission over the longer range. In other aspects, one or more of the communications and/or identifiers may be encrypted in a similar manner.

As discussed above, systems in accordance with the present invention advantageously provide the means to implement a control or access function at a local device or communication device using a mobile device or communication device to transmit the necessary communications via its short range and long range interfaces.

From a further broad aspect, according to the present invention there is provided a method of implementing a control or access function comprising receiving at a mobile device a short range communication from a local device having a local identifier stored in a memory thereof, the short range wireless communication comprising at least the local identifier, transmitting from the mobile device a long range wireless communication to a remote device, the long range wireless communication comprising at least the local identifier and a mobile identifier stored in a memory of the mobile device, receiving and processing the long range wireless communication at the remote device, and performing at least one control or access action based on the information obtained from processing of the long range communication.

In an alternative broad aspect, according to the present invention there is provided a method of implementing a control or access function comprising receiving at a communication device a short range communication from a mobile device having a mobile identifier stored in a memory thereof, the short range wireless communication comprising at least the mobile identifier, transmitting from the communication device a long range wireless communication to a remote device, the long range wireless communication comprising at least the mobile identifier and a local identifier stored in a memory of the communication device, receiving and processing the long range wireless communication at the remote device, and performing at least one control or access action based on the information obtained from processing of the long range communication.

The method is advantageous because a control or access function can be implemented in any existing devices that are capable of receiving and/or transmitting the wireless communications as set forth in the above method, enabling such a function to be implemented without significant installation costs or efforts. The controller of the remote device may control the performing of the at least one control or access action.

The step of transmitting from or receiving at a mobile device a short range wireless communication to/from a local device may comprise establishing any suitable communication, for example a Bluetooth LE communication or Near Field Communication (NFC), with the local device or communication device. Particularly for methods implemented for passive tokens, the method may further comprise providing power via a short range transmission from the mobile device to the local device, to enable the local device to release the local identifier. As discussed above, short range wireless communications may be communications that occur over a range of only a few cm to under about 1 m. Therefore the method may further comprise moving the mobile device into contact, or into close proximity, with the local device or communication device to initiate the short range communication with the local device or communication device.

The step of transmitting from the mobile device or communication device a long range wireless communication to the remote device may comprise establishing any suitable communication, for example a Bluetooth (or Bluetooth LE) communication or Wi-Fi or cellular data communication, with the remote device.

As discussed above, additional actions may be performed under other circumstances. The method may further comprise performing at least one further control or access action in the absence of receiving a further long range wireless communication from the mobile device or communication device at the remote device within a time period.

Any of the actions discussed above may comprise at least one or more of transmitting a control signal to control at least one device or system located in the vicinity of the local device or communication device, transmitting, via the long range wireless communication interface of the remote device or the communication device, at least one of information and a command to the mobile device or communication device, and storing information related to the mobile device and/or the local or communication device in a memory of the remote device. The control or access action may comprise transmitting a control signal to a device or system in the vicinity of the local device or communication device to switch on and/or to switch off the device or system. The control or access action may comprise at least one of operating a locking mechanism of a door, the door preventing access to at least one area when locked by the locking mechanism, operating a lighting system for lighting the area in which the local or communication device is located, operating a heating and/or cooling system for heating and/or cooling the environment in the vicinity of the local or communication device, operating at least one power source for enabling power to be provided to devices and systems located in the vicinity of the local or communication device, operating a communications device or system for enabling two-way communication with at least one remote communications device or system, operating an audio and/or video device or system for providing audio and/or video output to the area in the vicinity of the local or communication device, and operating any other powered device or system located in the vicinity of the local or communication device.

As discussed above and in particular in the alternative aspect where a passive token or the like is used, the local identifier received at the mobile device may not be in any way altered for security purposes. Therefore the method may further comprise processing at the mobile device the local identifier received from the local device to provide a processed communication, wherein the step of transmitting from the mobile device a long range wireless communication to the remote device comprises transmitting the processed communication. The processed identifier may prevent the identifier being immediately recognisable or readable. The method may comprise processing at the mobile device the local identifier received from the local device to provide an encrypted communication, wherein the step of transmitting from the mobile device a long range wireless communication to the remote device comprises transmitting the encrypted communication. Thus security of the communication to the remote device is increased. In other aspects, some or all identifiers transmitted to the remote device can be similarly processed.

The above method may be implemented on components of an existing system. This may be simply implemented by setting up the system by registering the various components for use with the system and installing any necessary software or applications, etc. From a further broad aspect, in accordance with the present invention there is provided a method of providing a system for implementing a control or access function, the method comprising registering a local device or communication device with a remote device by moving the local device or communication device within communication range of a short range reader of the remote device, storing information in a memory of the remote device comprising at least a local identifier of the local device or of the communication device, associating the local identifier stored in the memory of the remote device with at least one remotely located controllable system or device, and placing the local device or communication device in the vicinity of the remotely located controllable system or device such that the local device or communication device is visible to a user of the remotely located controllable system or device, wherein the local device is capable of releasing the local identifier only over a short range wireless communication or the mobile device is capable of releasing the mobile identifier only over a short range wireless communication, the remote device is capable of communicating over a long range wireless communication, and the local device or communication device when located in the vicinity of the remotely located controllable system or device is within the long range wireless communication of the remote device or communication device. Thus one or more local devices or communication devices, for example local devices implemented as passive tokens, can be registered with a remote device and then the tokens placed wherever it is required for their control or access function to be performed, which may be in a different location to the remote device. For example, when the token is to be used for accessing premises (i.e. to perform an access control function), the token can be stuck on the relevant door or on a wall next to the door, whereas the remote device may be located inside the premises, perhaps in an area that is not accessible to the user. By simply interacting with the token via a mobile device, the user is able to communicate with the remote device and access desired functions.

The above method may be implemented using an existing mobile device, such as a mobile computer, tablet, phone or smartphone. This may be simply implemented by registering the mobile device for use with the system and installing any necessary software or applications, etc., on the mobile device From a further broad aspect, in accordance with the present invention there is provided a method of registering a mobile device for use with a system for implementing a control or access function, the method comprising providing information relating to a mobile device to a remote device, the information relating to the mobile device comprising at least one address or number associated with the mobile device, transmitting a unique identifier from the remote device to the at least one address or number associated with the mobile device, providing to the mobile device an application having information for establishing secure communications with the remote device, processing the unique identifier with the application on the mobile device, the application determining whether the mobile device is to be registered with the system, and registering the mobile device with the system when the outcome of the determining step is positive. Thus a user's mobile device such as a smartphone can be provide with software, e.g. an application (or 'app'), that enables a code or unique identifier sent to the device from a remote device to be processed by the app and if the unique identifier has not previously been registered, the app is enabled on the mobile device for accessing the system.

As discussed above, a mobile device such as a smartphone can be used in the systems and methods in accordance with the present invention, for example by having an app on the mobile device to control and/or authenticate the various communications. From a further broad aspect, in accordance with the present invention there is provided a method of implementing a control or access function with a mobile device comprising a short range communication interface, a long range communication interface and a memory with a mobile identifier stored therein, the method comprising receiving a short range communication comprising a local identifier from a local device and transmitting a long range communication comprising the local identifier and the mobile identifier to a remote device, the communication for enabling the remote device to control or perform at least one control or access action in relation to a system or device located in the vicinity of the local device.

The remote device according to embodiments of the present invention can be any suitable device, such as an access point or wireless router. The remote device may control the implementation of the control or access function. From a further broad aspect, in accordance with the present invention, there is provided a controller for implementing a control or access function, the controller comprising a long range wireless communication interface for receiving a communication from a mobile device or communication device, and at least one control interface for controlling at least one system or device located in the vicinity of a local device or communication device, wherein the controller is configured to determine whether a mobile device is authorised to use the control or access function based on information contained in a long range wireless communication received from the mobile device or communication device, and the control interface is configured to control a system or device identified by an identifier contained in the long range wireless communication received from the mobile device or communication device when it is determined that the mobile device is authorised to use the control or access function. Thus there is provided a controller that can recognise a permitted or authenticated device in a system and can implement a control or access function in the vicinity of the permitted device in response to a communication from the device either directly or via a communication device.

The systems and methods described above involve long range wireless communication between a mobile device or communication device and a remote device that are separated by a distance of more than a few metres and typically would be separated to the extent that the mobile device could not readily be located near to the remote device. For example the mobile device and the remote device may be located in different areas or rooms of a building or floorplate or may be in different buildings or floorplates entirely.

The long range communication between the mobile device or communication device and the remote device can be direct communication, i.e. from the mobile device or communication device directly to the remote device and vice versa or the long range wireless communication can be indirect, i.e. the mobile device or communication device communicates with an intermediate device within long range wireless communication and the intermediate device communicates (either directly or indirectly) with the remote device. For example, the mobile device or communication device may communicate with an access point or router within long range wireless communication and that router communicates with the remote device either via a wireless or wired connection (e.g. via WiFi, a LAN, a WAN or the like).

Therefore systems in accordance with embodiments of the present invention can comprise more than one remote device with communications between the mobile device or communication device and the controlling remote device being via one or more other remote devices.

Figure 2:
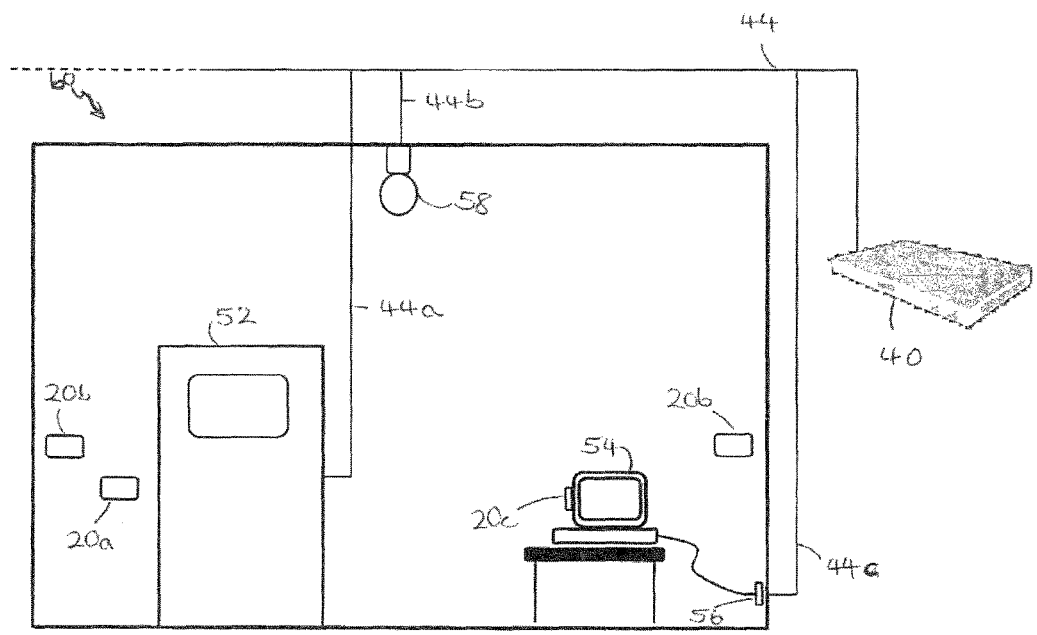
Figure 3:
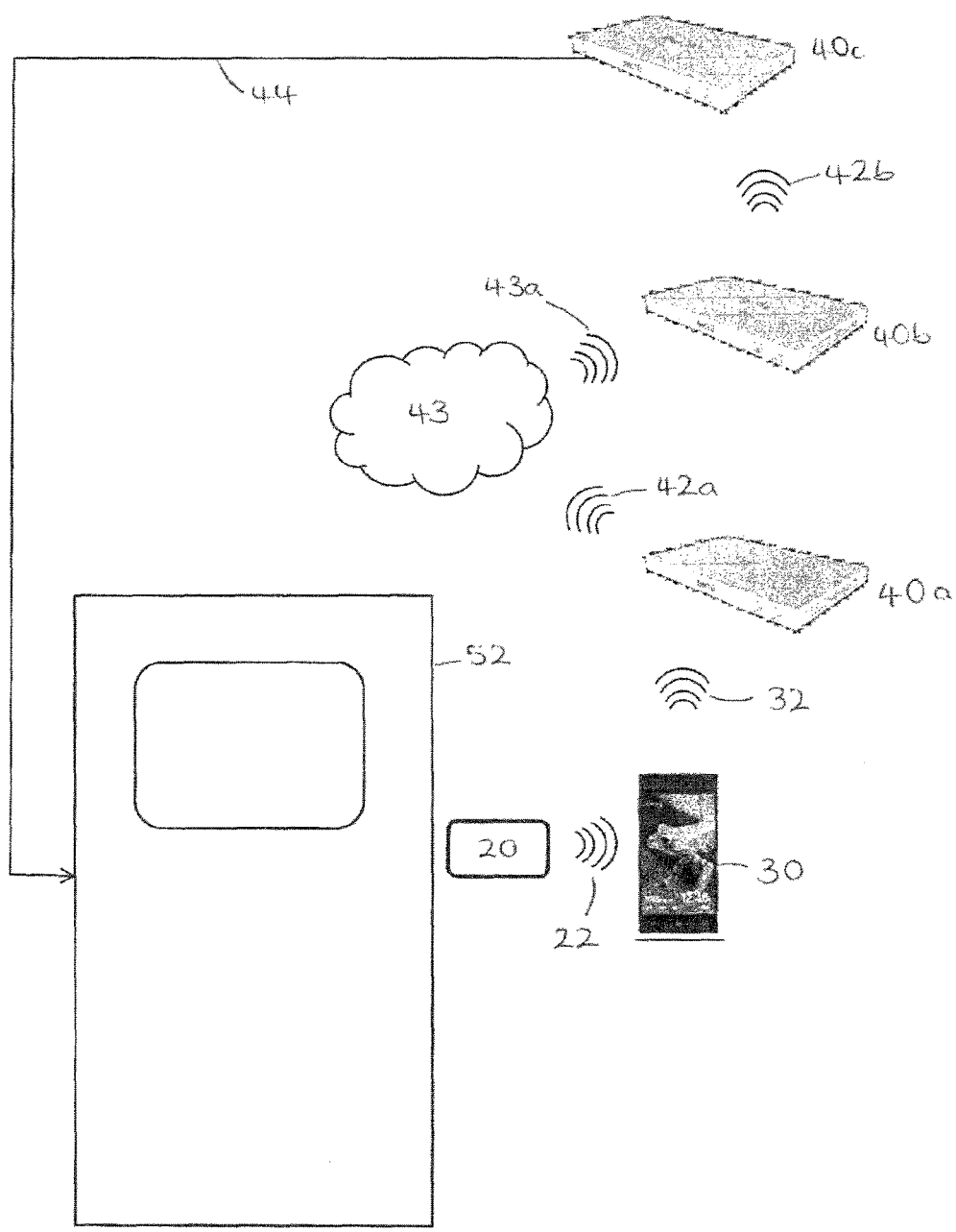
Figure 4:
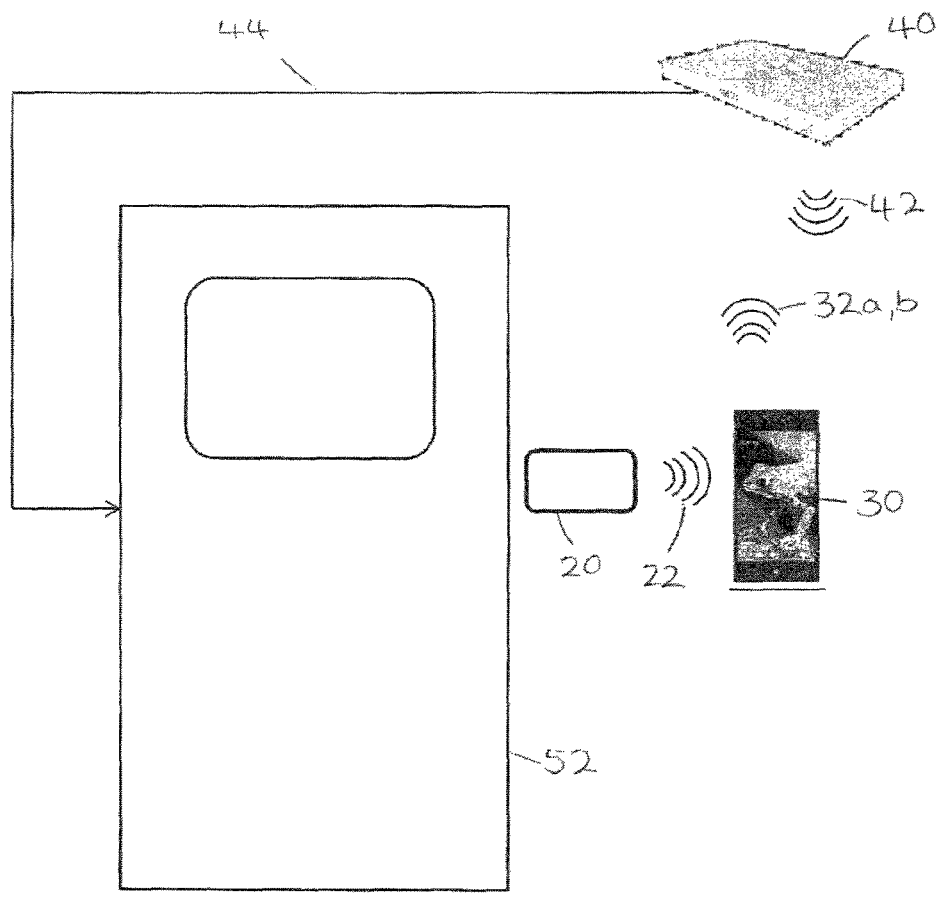
Figure 5:
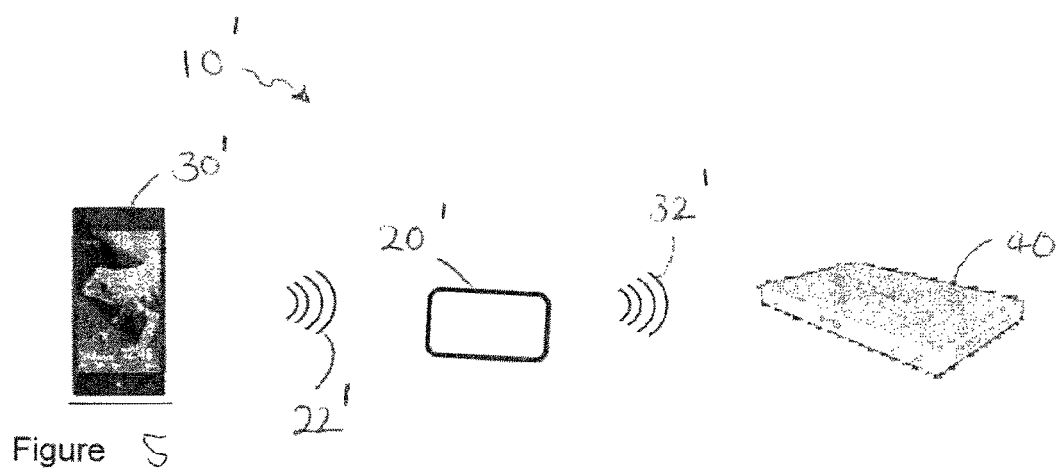
Figure 6:
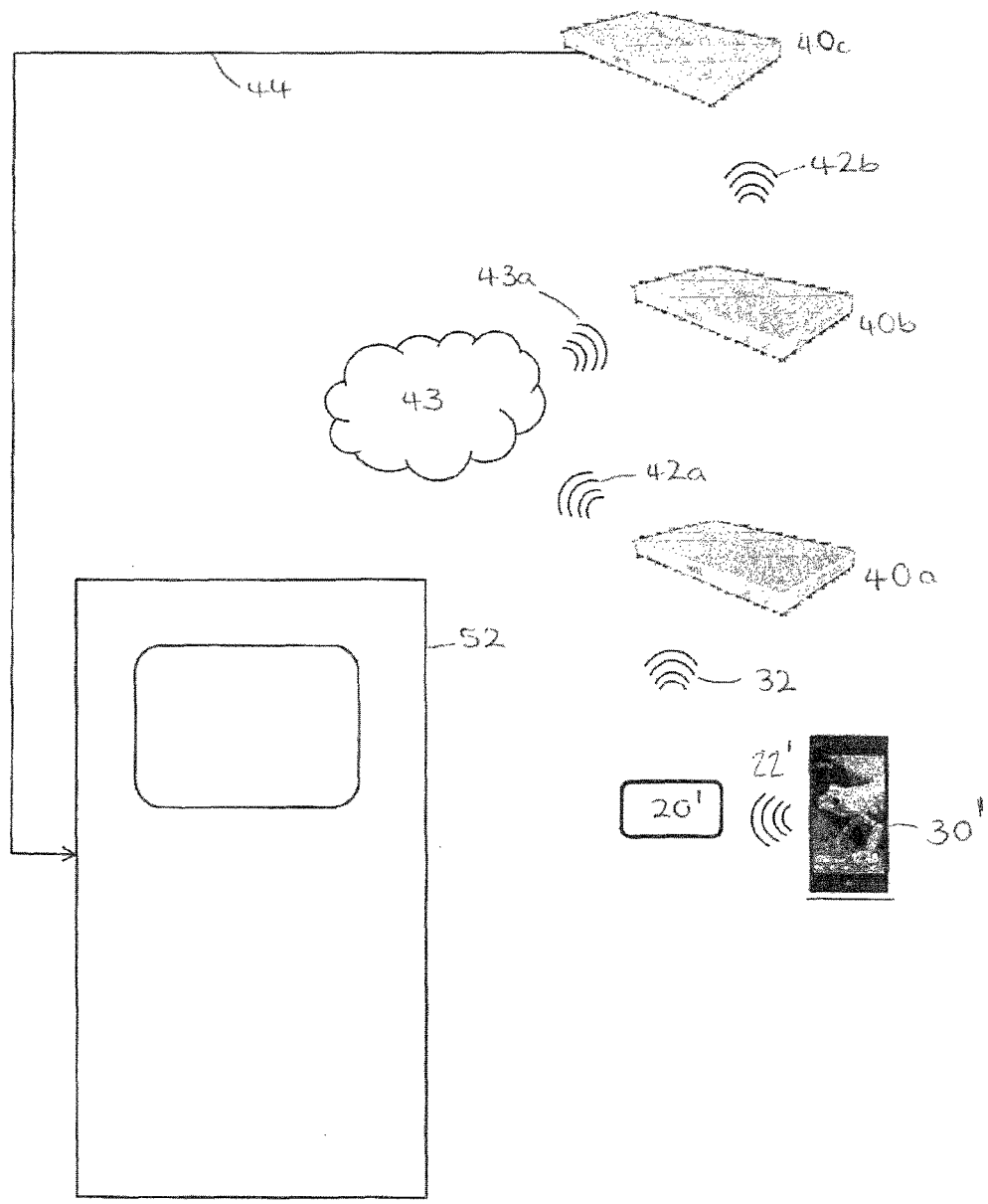
Figure 7:
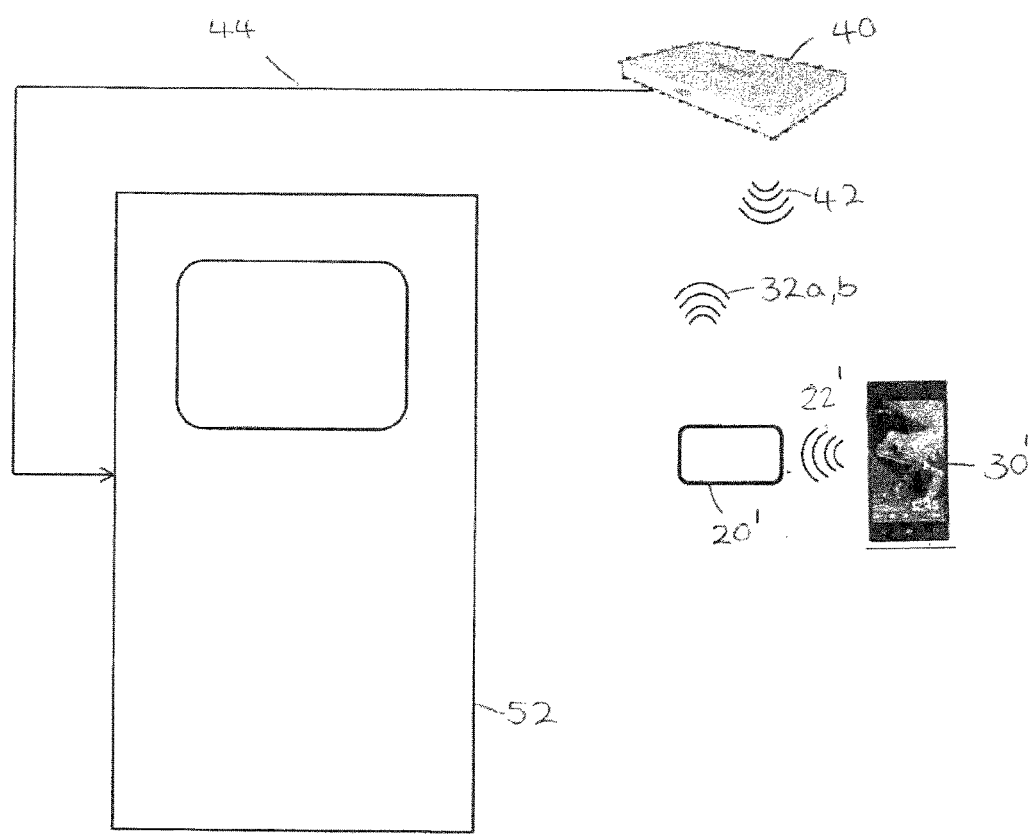

Embodiments of the present invention will now be described, by way of example only and with reference to the accompanying drawings, in which:

FIG. 1 schematically illustrates a system in accordance with embodiments of the present invention, in which a token communicates over a short range communication with a mobile device that communicates over a long range communication with a remote device;

FIG. 2 schematically illustrates a system in accordance with embodiments of the present invention, in which a remote device controls various functions of an office environment in response to a long range communication from a mobile device;

FIG. 3 schematically illustrates a system in accordance with embodiments of the present invention, in which a remote device controls an access function in response to an indirect long range communication from a mobile device;

FIG. 4 schematically illustrates a system in accordance with embodiments of the present invention, in which a remote device controls an access function in response to a direct long range communication and subsequent authentication from a mobile device;

FIG. 5 schematically illustrates a system in accordance with an alternative embodiment of the present invention, in which a local device communicates over a short range communication with a mobile device and also communicates over a long range communication with a remote device;

FIG. 6 schematically illustrates a system in accordance with an alternative embodiment of the present invention, in which a remote device controls various functions of an office environment in response to an indirect long range communication from a local device; and FIG. 7 schematically illustrates a system in accordance with embodiments of the present invention, in which a remote device controls an access function in response to a direct long range communication from a local device and subsequent authentication from a mobile device.

FIG. 1 illustrates a system 10 for implementing a control or access function in accordance with embodiments of the present invention. A mobile device 30, which in this illustration is a smartphone 30, has a short range communication interface comprising an near field communication chip and a long range communication interface comprising a Bluetooth LE chip. A remote device 40 comprises a wireless access point or controller 40 which is also Bluetooth LE enabled for receiving long range Bluetooth LE communications. Local device 20 is a passive token 20 and is located in the vicinity of an appliance or system which the user of the smartphone 30 may wish to operate or control. Prior to the token 20 being placed in the vicinity of the appliance/system, it is registered as part of the system 10 for implementing a control or access function as follows. The token 20 is presented to a reader at the server that controls the system, which in the FIG. 1 embodiment is the access point 40, but could for example be a remote server with which the access point 40 communications (such as server 40c as shown in FIG. 3). The server 40 recognises the token 20 and associates it with the appliance/system near to which it will soon be placed. The functionality that is required when the token 20 is used is selected at the server. For example, in the embodiments of FIGS. 2 to 4 a token 20 is associated with a lockable door 52 and the functionality required is for the door 52 to be locked or unlocked. Once the setup at the server 40 is completed, the token 20 is taken to appliance/system and placed in an appropriate location. For example, with reference again to the door 52 example, the token 20 is affixed (e.g. glued or otherwise stuck) next to the door 52. As long as there is then a remote device 40 within long range communication of the token 20, the system will be functional.

The mobile device 30 to be used in conjunction with tokens 20, such as the smartphone 30, must be registered with the system for implementing a control or access function. A credential can be issued to the smartphone 30 as follows. At the server 40 or any appropriately connected computer or the like, a user record is identified in the software. To register the smartphone 30 a credential is added, the credential being selected as 'NFC' type. An identifying address of the user of the smartphone 30 is entered, such as an e-mail address or a/the mobile phone 30 number and then the software sends a unique identifier and a link to the appropriate app to the user (via SMS or e-mail, e.g.). The user can then download the appropriate app to the smartphone 30 and enter the unique identifier into the app when it is first run on the smartphone 30. The app confirms whether the unique identifier has been previously registered with the system and if not, the smartphone 30 is enabled for use with the system.

The user interacts with the system via the registered smartphone 30 by bringing the smartphone 30 within range of a passive token 20 (i.e. by placing the smartphone 30 in contact with or very close to (within a few cms) the token 20). An identifier of the token 20 is transmitted via an NFC-protocol communication 22 to the smartphone 30. As the token 20 is passive, power for the transmission is provided by the smartphone 30 by inductive coupling. The app on the smartphone 30 takes the identifier of the token 20 and transmits it, along with a smartphone identifier (which may be a user ID, the credential created when the smartphone 30 is first registered, its phone number, an e-mail address, etc.) to the access point 40 via a long range communication 32, which in this embodiment is a Bluetooth LE communication. The transmission can be encrypted by the app prior to transmission for increased security. As the smartphone 30 is registered with the system, the access point 40 recognises the smartphone 30 and also the token 20 and its associated appliance/system, from the transmitted local identifier. The access point 40 can therefore immediately operate or control the appliance/system associated with the token 20 from the single long range communication 32.

In FIG. 2 a typical office environment 60 is schematically illustrated. The office 60 has an entry point which is closed by an electrically locked door 52. Inside the office there is a lighting system 58 and a computer 54, which is connected to a power supply 56. All of these appliances and systems are connected via a power bus 44 or other suitable system to a remote device 40 which is located in a server room some distance away from the office 60 and in a secure area that is inaccessible to a user of the office 60. A user wishing to enter the office 60 approaches the door 52 and needs only to place their registered smartphone 30 within close proximity of the door token 20a (preferably by touching it against the token 20a for an NFC communication). The token 20a transmits its local identifier to the smartphone 30 via, e.g. NFC, which transmits the local identifier and its own mobile identifier to the remote device 40, e.g. via Bluetooth LE. The remote device 40 recognises that the user has interacted with the door token 20a, by virtue of the local identifier and recognises that the smartphone 30 is registered, via the mobile identifier and performs an action via connection 44a to unlock the door 52 so the user can gain access to the office 60.

The user may wish to switch on the lighting system 58 once inside the office 60. This is achieved by holding the smartphone 30 close to one of the lighting tokens 20b located at various positions in the office 60 to instruct the remote device 40 to operate the lighting system 58 via connection 44b. The lighting tokens 20b may each have a unique identifier or each lighting token 20b may have the same identifier as another lighting token 20b (but that differs to all other tokens 20, such as the door token 20a and power token 20c). Whilst in this embodiment the user turns on the lighting system 58 if lighting is required, it is within the scope of the invention for the lighting system 58 to additionally or alternatively be operated by the remote device 40 in response to, for example, other actions of the user. For example, the remote device 40 could automatically turn on the lighting system 58 in response to the user interacting with the door token 20a, because it is assumed that by opening the door 52, the user wants to access the office 60 and the lighting system 58 will therefore need operating. This could be done only at certain times if desired, for example after a certain time in the evening when the office 60 might become dark. The remote device 40 can also deactivate the lighting system 58 even if the user does not interact with a lighting token 20b. For example the remote device 40 might determine that, in the absence of any other interactions of the user's smartphone 30 with any token 20 in the office 60 after a certain time period, the user has in all probability left the office 60 and therefore the lights should be turned off. In this scenario, the remote device 40 might transmit a long range signal requesting a response from the smartphone 30 to check whether the smartphone 30 is still in the office 60. If there is no response, the lighting system 58 can be switched off.

Inside the office 60 there is also a computer 54 which is powered from a power socket 56 which is connected to the remote device 40. If the user wishes to operate the computer 54, the smartphone 30 can be touched to or placed very near to the computer token 20c that is stuck on the side of the computer 54. The computer token 20c transmits its identifier to the smartphone 30 so that the remote device 40 can switch on the power to socket 56 via connection 44c. It may be that the user is only permitted to use the computer 54 for a period of time, e.g. for one hour. The remote device 40 can determine this based on either the mobile identifier transmitted from the smartphone 30 and/or from the data in its database. In such a scenario, the remote device 40 can automatically switch of the computer 54 after the time has elapsed.

FIG. 3 schematically illustrates a similar system to the FIG. 2 arrangement but in this scenario more than one remote device is provided because the local office is part of a large environment having multiple controllers and/or access points, etc. A door 52 permits entry to one specific area and has an electric locking mechanism as before. A smartphone 30 is presented to a door token 20 as in other examples and transmits its identifier via a short range communication 22 to the smartphone 30. The local identifier and an identifier of the smartphone 30 are transmitted via a long range communication 32 to a remote device 40a that is within the long range. However remote device 40a is not the controlling device/server of the system, which is instead controller 40c. In this arrangement, the remote device 40a that communicates with the smartphone 30 transmits onwards the long range communication 42a to a network 43 (which may, for example be a local area network, or a wide area network or the Internet, etc.). The network transmits the communication 43a onwards to another device 40b of the system which is in long range communication 42b with the controller 40c of the system. The controller 40c on receiving the long range communication 42b recognises the token 20 and the smartphone 30 and operates the door 52 via connection 44 to enable the user to enter the building through door 52.

FIG. 4 schematically illustrates a similar system to the FIG. 3 arrangement, but the remote device 40 that is within long range communication of the token 20 (and thus the mobile device 30) is the system controller. In this embodiment, the smartphone 30 is placed close to the token 20 as before to receive the local identifier via a short range communication 22 and transmits the local identifier and its mobile identifier to the remote device 40 via a long range communication 32a. The controller 40 recognises the local identifier and the smartphone 30 and determines an extra security step is required before the door 52 can be opened. Therefore the controller 40 sends a command 42 back to the smartphone 30 and the app running thereon displays a screen to the user which requires an input (such as a PIN, another code, a set of movements, facial recognition or any other identifier or code). If the user responds to the request for input a long range communication 32b is sent to the controller 40 for further authentication and if the input is authenticated, the controller 40 operates the door 52 via the connection 44.

Therefore there are provided systems and methods for intelligently managing control and access functions in which a user does not need to carry a dedicated control or access device and are therefore convenient, in which passive tokens can be used instead of powered devices so that significant energy is conserved and the installation of the tokens is greatly simplified compared with the need to wire in and power conventional local devices. The systems and methods enable a user to be securely identified and granted control or access where appropriate by identifying the user and the appliance, system or device where the user is located and triggering an appropriate event at the locality of the user if access or control should be granted. FIG. 5 illustrates a system 10 for implementing a control or access function in accordance with an alternative embodiment of the present invention. A mobile device 30', which in this illustration is a smartphone 30', has a communication interface comprising a Bluetooth LE chip that provides both a short range communication interface and long range communication interface. A remote device 40 comprises a wireless access point or controller 40 which is also Bluetooth LE-enabled for receiving long range Bluetooth LE communications. Local device 20' is a communication device 20' provided with Bluetooth LE chip that provides both a short range communication interface when operating in low-power "Whisper Mode" and long range communication interface when operating in a normal-power mode. Local device 20' is located in the vicinity of an appliance or system which the user of the smartphone 30' may wish to operate or control. Local device 20' is registered as part of the system 10 for implementing a control or access function. The remote device 40 is provided with details for the local device 20' and associates it with the appliance/system near to which it is located. The functionality that is required when the local device 20' is used is selected at the remote device 40.

For example, in the embodiments of FIGS. 6 and 7 a local device 20' is associated with a lockable door 52 and therefore the functionality required is for the door 52 to be locked or unlocked. Once the setup at the remote device 40 is completed, the local device 20' is taken to appliance/system and placed in an appropriate location. For example, in order to lock or unlock the door 52, the local device 20' is affixed (e.g. glued or otherwise stuck) next to the door 52. As long as there is then a server 40 within long range communication of the local device 20', the system will be functional.

The mobile device 30' to be used in conjunction with local devices 20', for example a smartphone 30', must be registered with the system for implementing a control or access function. A credential can be issued to the smartphone 30' as follows. At the remote device 40 or any appropriately connected server or computer or the like, a user record is identified in the software. To register the smartphone 30' a credential is added, the credential being selected as a Bluetooth Low Energy or 'BLE' type. An identifying address of the user of the smartphone 30' is entered, such as an e-mail address or a/the mobile phone 30' number and then the software sends a unique identifier and a link to the appropriate app to the user (via SMS or e-mail, e.g.). The user can then download the appropriate app to the smartphone 30' and enter the unique identifier into the app when it is first run on the smartphone 30'. The app confirms whether the unique identifier has been previously registered with the system and if not, the smartphone 30' is enabled for use with the system.

The user interacts with the system via the registered smartphone 30' by bringing the smartphone 30' within range of a local device 20' (i.e. by placing the smartphone 30' in contact with or very close to (within a few cms) the local device 20'). An identifier of the mobile device 30' is transmitted via an Bluetooth LE communication 22' to the local device 20'. The local device 20' is operating in a power saving mode, with only Bluetooth LE 'Whisper Mode' active, thereby reducing the range within which it can communicate with the mobile device 30'. The local device 20' takes the identifier of the mobile device 30' (which may be a user ID, the credential created when the smartphone 30' is first registered, its phone number, an e-mail address, etc.) and powers up to operate in a higher-power or normal-power Bluetooth LE mode and then transmits the mobile identifier, along with a local identifier, to the remote device 40 via a long range communication 32', which in this embodiment is a higher-power or normal-power Bluetooth LE communication. The transmission can be encrypted by either or both of the mobile 30' and local 20' device(s) prior to transmission for increased security. As the smartphone 30' is registered with the system, the remote device 40 recognises the identifiers associated with the smartphone 30' and also the local device 20' and its associated appliance/system, from the transmitted identifiers. The remote device 40 can therefore immediately operate or control the appliance/system associated with the local device 20' from the single long range communication 32'.

In the above described embodiment in relation to FIG. 2 there is described an electrically locked door 52, a lighting system 58 and a computer 54 connected to a power supply 56. All of these appliances and systems are connected via a power bus 44 or other suitable system to a remote device 40 which is located in a server room some distance away from the office 60 and in a secure area that is inaccessible to a user of the office 60. As an alternative to this embodiment, the above-described local devices 20' can be substituted for the tokens 20a and 20b to enable a user wishing to enter the office 60 using their registered smartphone 30' and to enable the user to switch on the lighting system 58 once inside the office 60 using their smartphone 30'. The computer 54 can be similarly activated using the smartphone 30' touched to or placed very near to the computer token 20c, in this alternative embodiment substituted for a local device 20', that is stuck on the side of the computer 54.

FIG. 6 schematically illustrates a similar system to the alternative FIG. 2 arrangement described above but in this scenario more than one remote device 40a, 40b, 40c is provided because the local office is part of a large environment having multiple controllers and/or access points, etc. A door 52 permits entry to one specific area and has an electric locking mechanism as before. A smartphone 30' is presented to a local device 20' as in other examples and transmits its mobile identifier via a short range communication 22' to the local device 20'. The local identifier of the local device 20' and mobile identifier of the smartphone 30' are transmitted by the local device 20' via a long range communication 32 to a remote device 40a that is within the long range. However, remote device 40a is not the controlling device/server of the system, which is instead controller 40c. In this arrangement, the remote device 40a that communicates with the local device 20' transmits onwards the long range communication 42a to a network 43 (which may, for example be a local area network, or a wide area network or the Internet, etc.). The network transmits the communication 43a onwards to another device 40b of the system which is in long range communication 42b with the controller 40c of the system. The controller 40c on receiving the long range communication 42b recognises the local device 20' and the smartphone 30' and operates the door 52 via connection 44 to enable the user to enter the building through door 52.

FIG. 7 schematically illustrates a similar system to the FIG. 6 arrangement, but the remote device 40 that is within long range communication of the local device 20' (and thus the mobile device 30') is the system controller. In this embodiment, the smartphone 30' is placed close to the local device 20' as before to receive the mobile identifier via a short range communication 22' and transmits the local identifier and mobile identifier to the remote device 40 via a long range communication 32a. The controller 40 recognises the local identifier and the mobile identifier and determines an extra security step is required before the door 52 can be opened. Therefore the controller 40 sends a command 42 back to the smartphone 30' via a suitable long range communication protocol, in this example also Bluetooth LE but could be Wi-Fi or a cellular data network for example, and the app running thereon displays a screen to the user which requires an input (such as a PIN, another code, a set of movements, facial recognition or any other identifier or code). If the user responds to the request for input a long range communication 32b is sent to the controller 40 for further authentication and if the input is authenticated, the controller 40 operates the door 52 via the connection 44.

Therefore there are provided systems and methods for intelligently managing control and access functions in which a user does not need to carry a dedicated control or access device and are therefore convenient, in which a low-power battery-powered local device can be used instead of mains-powered devices so that significant energy is conserved or in which a wireless local device can be used so that data cabling need not be installed to connect the local device to a remote device and the installation of the tokens is greatly simplified compared with the need to wire in and power conventional local devices. The systems and methods enable a user to be securely identified and granted control or access where appropriate by identifying the user and the appliance, system or device where the user is located and triggering an appropriate event at the locality of the user if access or control should be granted.

What is claimed is:

1. A controller for implementing a control or access function, the controller comprising:
   a long range communication interface for receiving a communication from a mobile device; and
   at least one control interface for controlling at least one system or device located in the vicinity of a local device, wherein:
   the controller is configured to determine whether a mobile device is authorised to use the control or access function based on information contained in a long range communication received from the mobile device, and
   the control interface is configured to control a system or device identified by an identifier contained in the long range communication received from the mobile device when it is determined that the mobile device is authorised to use the control or access function; and
   wherein the controller is further configured to:
   monitor for receipt of a further communication from the mobile device; and
   in the absence of receiving a further communication from the mobile device, perform at least one further control or access action to control the system or device.

2. The controller as claimed in claim 1, wherein the local device has a local identifier and the identifier contained in the long range communication is the local identifier of the local device.

3. The controller as claimed in claim 2, wherein the at least one system or device is located in the vicinity of one of a group of local devices, each local device having a local identifier, each local device being associated with at least one system or device located in the vicinity of the local device, and wherein the system or device is identified by its association with the local identifier of a local device.

4. The controller as claimed in claim 2, wherein the mobile device is configured to provide power to the local device when the mobile device is brought into contact or into close proximity, with the local device, to enable the local device to release the local identifier to the mobile device.

5. A controller as claimed in claim 2, wherein the mobile device further comprises a processor configured for processing the local identifier received from a local device such that the communication transmitted to the controller comprises the processed local identifier.

6. A controller as claimed in claim 5, where the processor is configured for encrypting the local identifier.

7. The controller a claimed in claim 1, wherein the at least one system or device is located in the vicinity of one of a group of local devices and wherein the further communication from the mobile device contains a local identifier of at least one of the group of local devices.

8. The controller as claimed in claim 1, wherein the controller is configured to control further the system or device in the absence of receiving a further communication from the mobile device within a time period.

9. The controller as claimed in claim 1, wherein the local device comprises a passive token.

10. The controller as claimed in claim 1, wherein the mobile device comprises a mobile communications device.

11. The controller as claimed in claim 10, wherein the mobile communications device is selected from the group consisting of:
    a smartphone, and
    a tablet.

12. The controller as claimed in claim 1, wherein the mobile device comprises a short range communication interface.

13. The controller as claimed in claim 12, wherein the short range communication interface is a near field communications (NFC) interface and the mobile device is an NFC-enabled smartphone.

14. The controller as claimed in claim 1, wherein the controller is configured to perform at least one of the following control or access actions:
    transmitting a control signal to control at least one device or system located in the vicinity of the local device,
    transmitting, via the long range communication interface of the controller, at least one of information and a command to the mobile device, and storing information related to the mobile device and/or the local device in a memory of the controller.

15. The controller as claimed in claim 1, wherein the controller is configured to transmit a control signal to a device or system in the vicinity of the local device to switch on and/or to switch off the device or system.

16. The controller as claimed in claim 1, wherein the device or system in the vicinity of the local device comprises at least one of:
- a locking mechanism for a door, the door preventing access to at least one area when locked by the locking mechanism,
- a lighting system for lighting the area in which the local device is located,
- a heating and/or cooling system for heating and/or cooling the environment in the vicinity of the local device,
- at least one power source for enabling power to be provided to devices and systems located in the vicinity of the local device,
- a communications device or system for enabling two-way communication with at least one remote communications device or system, and
- an audio and/or video device or system for providing audio and/or video output to the area in the vicinity of the local device.

17. A method of implementing a control or access function, the method comprising:
- receiving a communication from a mobile device over a long range communication interface;
- determining whether the mobile device is authorised to use a control or access function based on information contained in the long range communication received from the mobile device, and
- controlling a system or device identified by an identifier contained in the long range communication received from the mobile device when it is determined that the mobile device is authorised to use the control or access function, wherein the system or device is located in the vicinity of a local device;
- monitoring for receipt of a further communication from the mobile device; and
- in the absence of receiving a further communication from the mobile device, performing at least one further control or access action to control the system or device.

18. A method according to claim 17, wherein the local device has a local identifier and the identifier contained in the long range communication is the local identifier of the local device.

* * * * *